Feb. 9, 1954 W. O. BRIDGE 2,668,734
TRAILER FOR CARRYING GENERAL FREIGHT AND AUTOMOBILES
Filed Sept. 28, 1949 8 Sheets-Sheet 2

INVENTOR.
William O. Bridge.
BY
Harness, Dickey & Pierce.
ATTORNEYS.

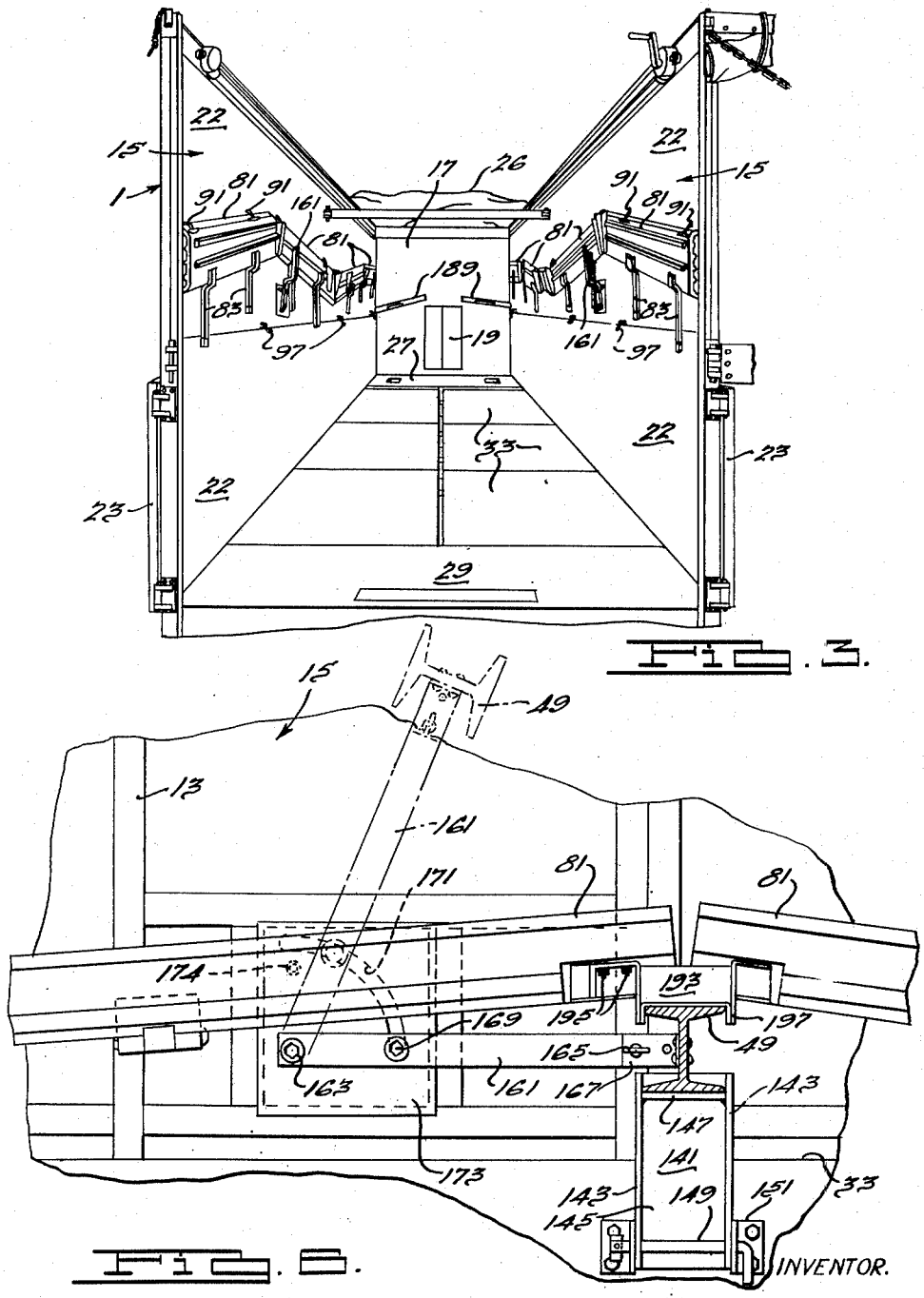

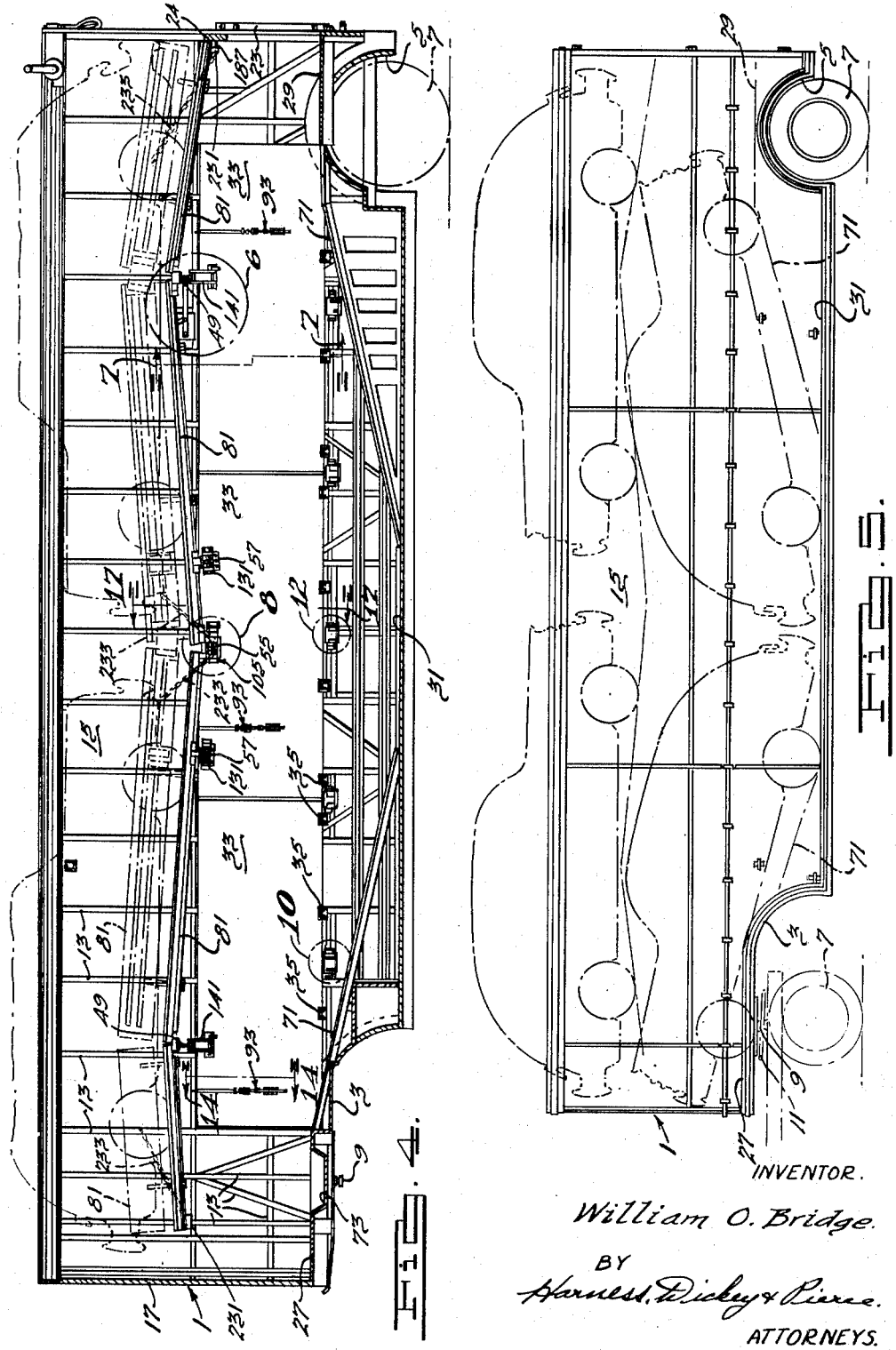

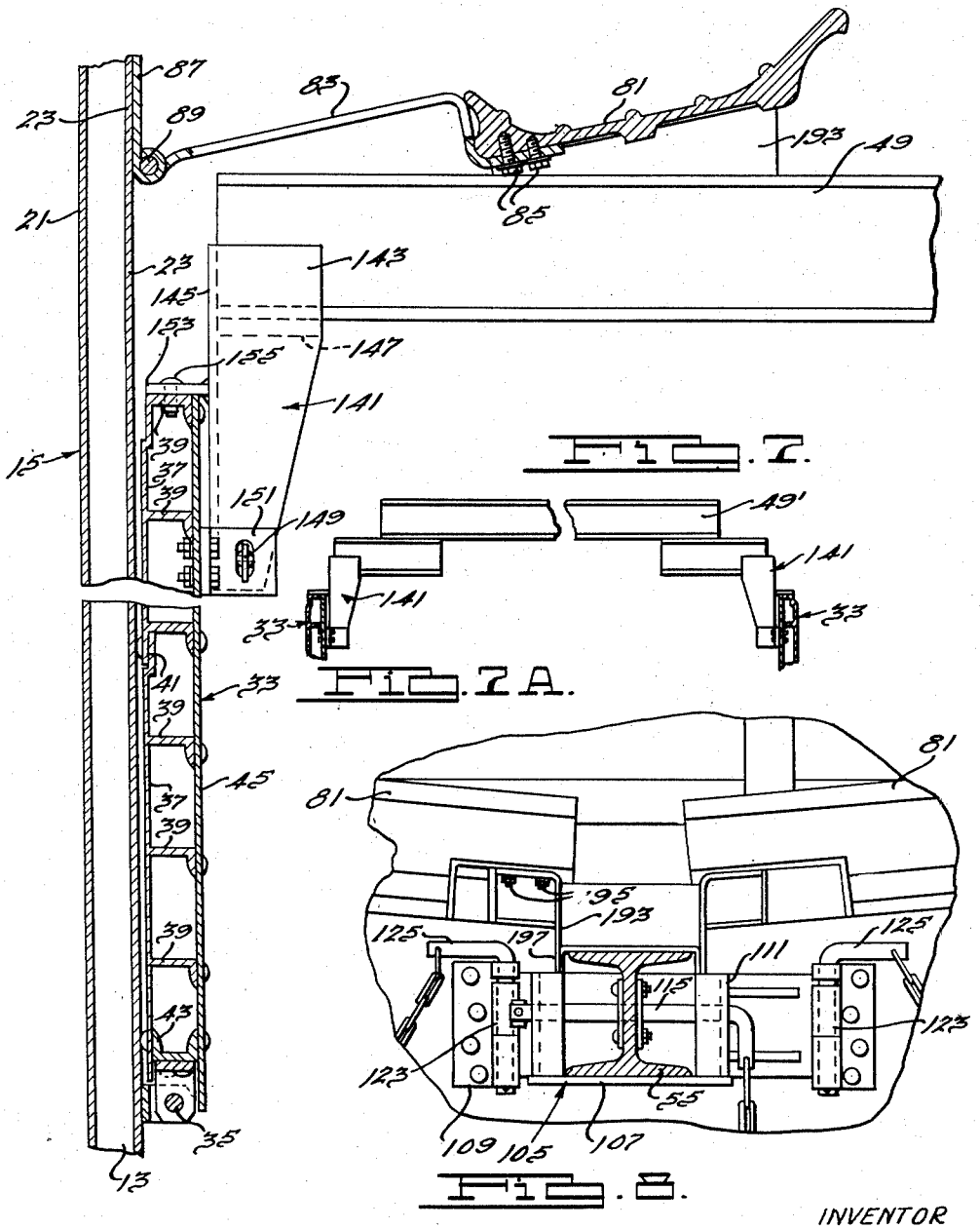

INVENTOR.
William O. Bridge.
BY
Harness, Dickey & Pierce.
ATTORNEYS.

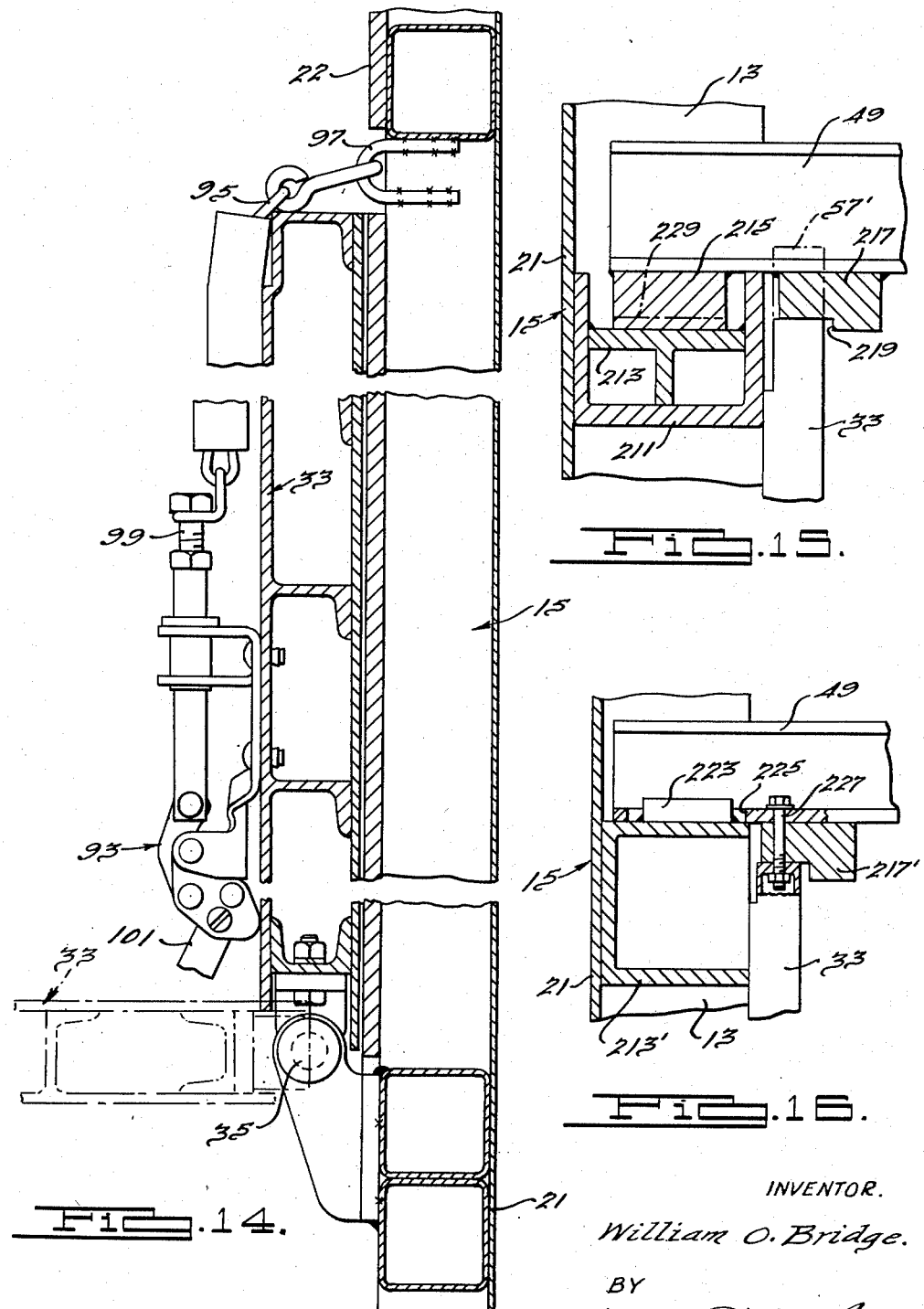

Feb. 9, 1954   W. O. BRIDGE   2,668,734
TRAILER FOR CARRYING GENERAL FREIGHT AND AUTOMOBILES
Filed Sept. 28, 1949   8 Sheets-Sheet 8
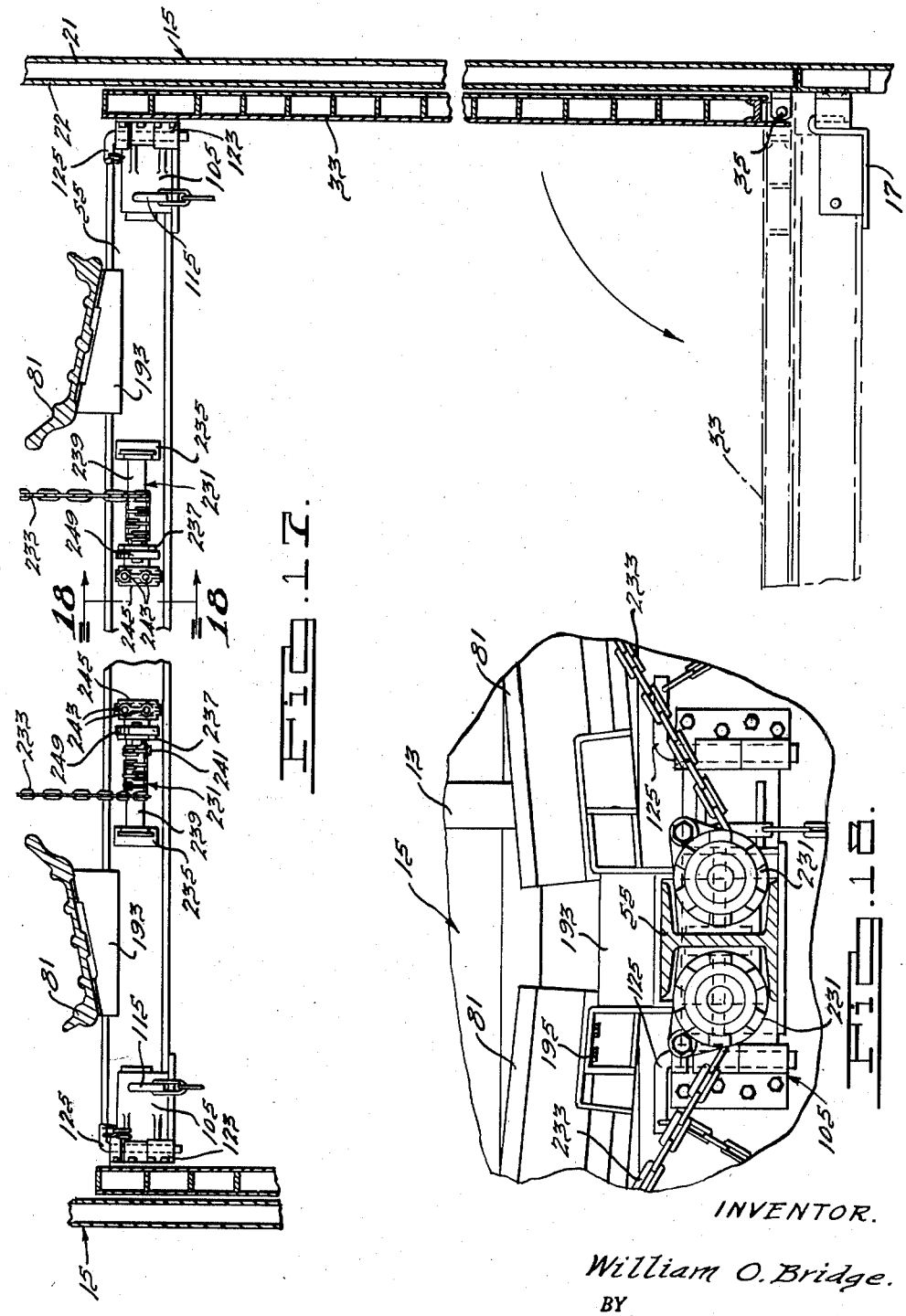
INVENTOR.
William O. Bridge.
BY
Harness, Dickey & Pierce.
ATTORNEYS.

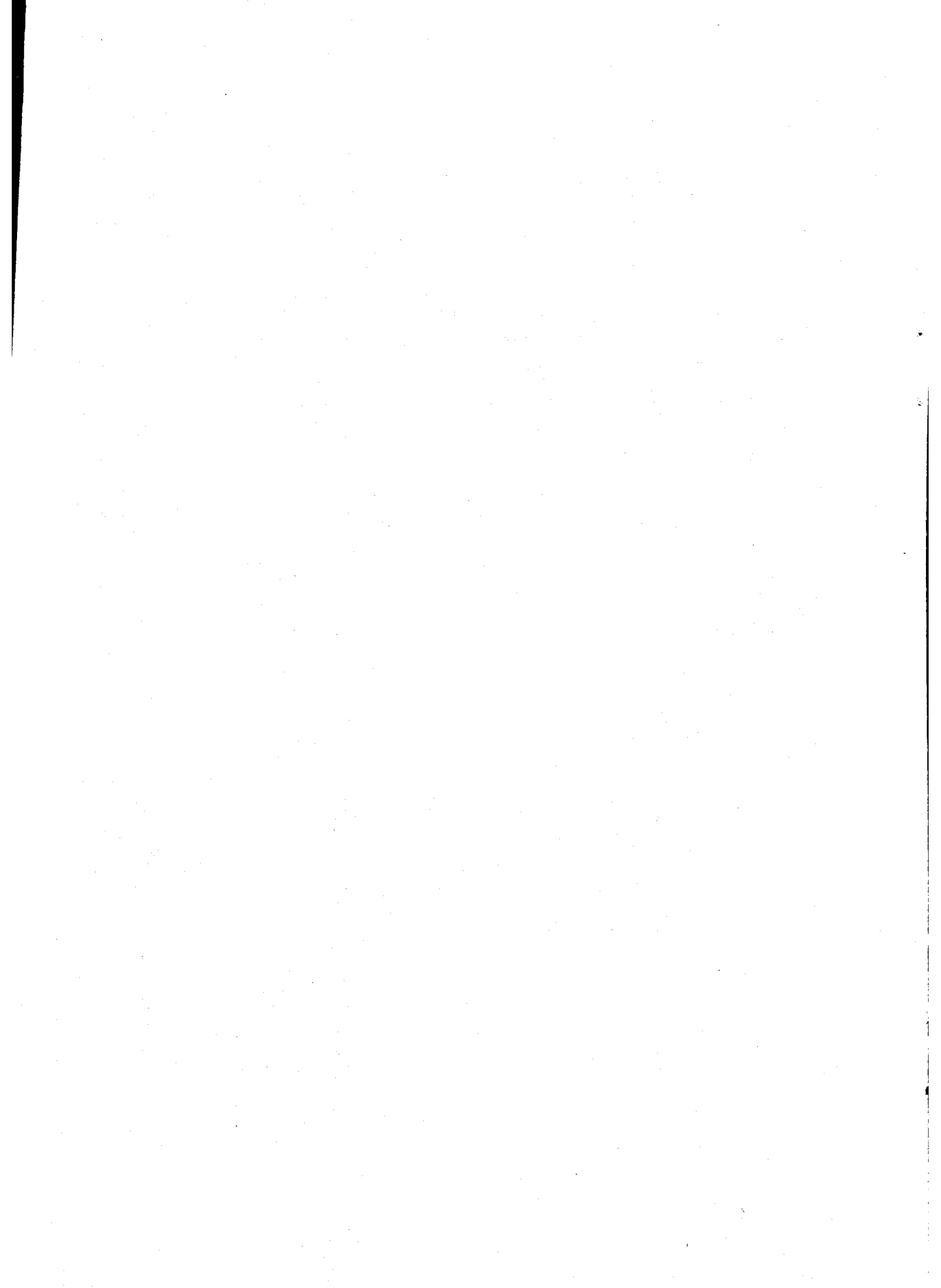

Patented Feb. 9, 1954

2,668,734

UNITED STATES PATENT OFFICE 2,668,734

TRAILER FOR CARRYING GENERAL FREIGHT AND AUTOMOBILES

William O. Bridge, Detroit, Mich., assignor to Evans Products Company, Plymouth, Mich., a corporation of Delaware Application September 28, 1949, Serial No. 118,331

14 Claims. (Cl. 296—1)

This invention relates to highway transport vehicles and in particular to conversion means for highway transport vehicles of the drop center type that is convertible from an automobile haulaway to a freight van and vice versa as disclosed and claimed in the copending application of William O. Bridge entitled, "Trailer for Carrying General Freight and Automobiles," Serial No. 16,034, filed March 20, 1948, now Patent No. 2,636,772.

The application referred to discloses a highway transport that is known in the art under the trade-name "Tri-Level" trailer. Its particular virtue is that it permits the trailer to be used to haul automobiles one way and on the return trip to haul freight, thus eliminating deadheading. It is provided with convertible means that furnish three storage surfaces at three different levels, only two of which are ordinarily used at any one time. The drop center frame surface at the lowermost level, which is used primarily to support the lowermost level of automobiles but which may also be used as an auxiliary freight storage surface, is fixed and ordinarily lies between and near the plane of the axles which support the trailer body. The other two levels are provided by movable or convertible means and of these the uppermost is usually in the form of tracks used to support automobiles and the middle level comprises flat members to form the main floor that is used to stow freight. Preferably, the middle level, which is actually a movable floor, is coincident with the plane of dock-high platforms at the front and rear of the trailer body. When used as a freight van, the tracks or supports forming the upper level are moved to an inoperative position which interferes as little as possible with the general freight-receiving space and the members forming the middle level are placed in operative position; when used as an automobile haulaway, the arrangement is reversed and the upper level is operative while the middle level is eliminated to give room for the lowermost layer of automobiles that are supported at the lowermost level.

While the trailer structures disclosed in the above-identified copending application have functioned satisfactorily, they represent the initial developments of an entirely new type of highway vehicle and further experience has given rise to certain refinements and simplifications that are disclosed and claimed herein. It should be recognized that since the trailers with which the invention is concerned must satisfy regulations connected with travel on public highways, the problems involved are exacting and quite different from those faced in attempting to achieve a similar result in railroad freight car construction. In highway trailers, limitations on weight and the over-all dimensions of height, width and length are such that fine adjustments are required to strike the proper balance between strength and payload capacity. The problem is complicated further by the usual desire to maintain simplicity, low cost and a minimum requirement of operator skill. A further complicating factor peculiar to the convertible trailer of this invention and the aforesaid application is the possibility of spot damage to stowed automobiles or freight by projecting structure used to form one or the other of the movable levels.

It is thus an object of the present invention to improve, simplify and reduce the cost and weight of the three- or multi-level trailer and at the same time retain sufficient structural strength for the two different types of service for which it is employed.

Another object is to provide convertible surface-forming structure or arrangements for dual purpose vehicles of the type described which occupy a minimum of space and have a minimum of projecting parts to interfere with the storage of automobiles or freight.

A further object is to provide convertible surface-forming structure for dual purpose vehicles of the type described in which certain members are employed in the formation and support of both the middle and uppermost levels, thus reducing the number of required parts.

Another object is to increase the ease and speed with which the multi-purpose vehicle may be converted from one use to another.

Another object is to decrease the operator skill required to load automobiles into a convertible highway trailer of the type described.

An additional object is to provide suitable means in a multi-level trailer for firmly securing automobiles on the movable upper level in fixed position relative to the sidewalls.

In the preferred construction for accomplishing these and other objects of the invention, both the members which form the middle level or main freight floor and the members which form the uppermost level on which the top layer of automobiles is supported are hinged or pivotally connected to the sidewalls of the trailer body. When not in use, each set of members may be swung upwardly to an upright position adjacent the inner sidewalls of the body, in which they provide no interference to the storage of automobiles or freight. A removable set of crossbeams, preferably of standard structural shape, such as I-beams, and preferably also of lightweight metal, such as aluminum alloy, is used to commonly support both sets of level forming members, thus keeping the number of movable parts to a minimum. When used to support the members which form the main freight floor or middle level, the crossbeams, which extend transversely of the longitudinal axis of the trailer, are removably mounted on the sidewalls of the body, preferably through the medium of suitable sockets. When used to support the members which form the uppermost automobile supporting level, the crossbeams are preferably removably supported on the main freight floor members, which have been swung on their hinges to upright position. The floor members are rigid panels of approximately one-half the width of the trailer and they transmit the loads from the crossbeams through their hinges to the sidewalls at points considerably below the upper level. This feature reduces the column loads on the sidewalls and makes it possible to decrease the weight and strength of the sidewall construction without any sacrifice whatsoever in structural stability. The characteristic structural stability of the sidewall structure and entire trailer body is further enhanced by connecting the upright panels to the sidewalls and the beams to the panels in such a manner that the beams are subject to axial loads accompanying tendencies of the sidewalls to bulge inwardly or outwardly and thus serve as tie bars. The notion of supporting the structure contained in the uppermost level on the members which form the main freight floor makes it possible to construct the main freight floor members of rigid half-trailer-width panels without necessitating the support of the uppermost level at such a height that automobiles thereon would rise above the 12′ 6″ height limitation of some States. The rigid floor panel construction has the important advantage of substantially reducing the number of movable freight floor parts, simplifying the floor construction and making it very easy to handle.

Among the other and more detailed features of construction by means of which the invention accomplishes the objects set forth above are several which increase the safety of the operations of loading and unloading automobiles by decreasing the skill and care required of the operator. One of these is the use of longitudinal tracks for the uppermost level which are slanted to the horizontal so that the inner longitudinal edges are several inches higher than the outer longitudinal edges. This construction not only has the important advantage of increasing the height for the lower layer of automobiles by four or five inches while boosting the upper level of automobiles only about three-quarters of an inch, but also provides the safety feature of automatically steering or centering automobiles driven on the upper track so that there is no danger of the operator driving the automobile so far to one side as to strike a sidewall. Another is the use of an arched crossbeam to support the upper tracks at the forward end of the trailer. When an automobile is driven into the inclined lower layer and the brakes applied, even lightly, the automobile bounces. The dimensional limitations are so close that such uncontrolled movement could, with straight crossbeams, result in marring of the automobile by forcible contact with the bottom of the crossbeams, a danger that is eliminated by arching of the crossbeams. At the aft end of the trailer, the rearmost crossbeam is also a potential interferer with automobiles in the lower layer and it cannot be finally placed in position to support the tracks of the upper level until the lower level is loaded with automobiles. Movement of this crossbeam could be awkward and difficult due to its length and the fact that it rests on the sidewalls in a position that is directly over the hood or windshield of a lower level automobile and, therefore, would obligate the operator to climb on the automobile to effectuate installation. This is eliminated, however, by another feature of the invention by virtue of which the rear crossbeam is removably but swingably mounted on the sidewalls so that it can be readily swung into or out of track-supporting position with no possibility of damage to the automobile beneath.

Another feature of practical importance is the tie down arrangement of the present invention. Tie down means ordinarily include a flexible cable or chain that is secured to the axis of the automobile and to a member beneath and longitudinally of the automobile. In this invention, a central crossbeam is conveniently used as the member and, by tying automobiles to both sides thereof, horizontal or longitudinal forces thereon tend to cancel each other to provide a favorable stress condition in the beam. Sufficient tension is placed in the chain to depress the automobile springs and flatten the tires to some extent so as to allow little or no bouncing of the automobile body. This force in the chains acts upwardly on the beam, which, as indicated above, is removable. Therefore, it becomes susceptible itself to bouncing but this is prevented in this invention by suitable means which prevents vertical movement of the beam relative to the sidewalls of the trailer.

Other objects and features of construction will become apparent upon consideration of the accompanying drawings, in which:

Figure 3 is a perspective view similar to that of Figure 2 but with the floor panels in lowered position so that the trailer is in condition to haul general freight;

Figure 4 is a side elevation, partly in section, of the trailer in the condition of Figure 1, i. e. ready to carry automobiles, and shows in dotted lines the stowed position occupied by the hinged upper auto tracks when the trailer is adapted to carry general freight;

Figure 5 is a diagrammatic side elevation, similar to that of Figure 4, which shows the positions occupied by automobiles that are carried by the trailer;

Figure 6 is an enlarged view of the structure encompassed by the circle 6 in Figure 4 and shows how the rear upper crossbeam is swingably supported on the floor panels and on the walls of the trailer so that it may be elevated above the roof of cars entering or leaving the lower tracks;

Figure 7 is a section taken on line 7—7 of Figure 2 and shows the hinge connections of the upper track and the floor panels to the sidewalls and the manner in which the crossbeams may be supported on the floor panels;

Figure 7A shows a modified form of crossbeam;

Figure 8 is an enlarged view of the structure within the circle 8 of Figure 4 and shows the manner in which the central crossbeam is supported on the floor panel and the tracks on the crossbeam;

Figure 14 is a cross section taken on line 14—14 of Figure 4 to show means for holding the floor panels in upright position;

Figures 15 and 16 are partial sectional views showing modificatinons of the manner in which the crossbeams may be connected to the upright floor panels and sidewalls;

Figure 17 is a partial cross section taken on line 17—17 of Figure 4 and shows the tie down means on the central crossbeam; and Figure 18 is a sectional view taken on line 18—18 of Figure 17.

Figure 1:
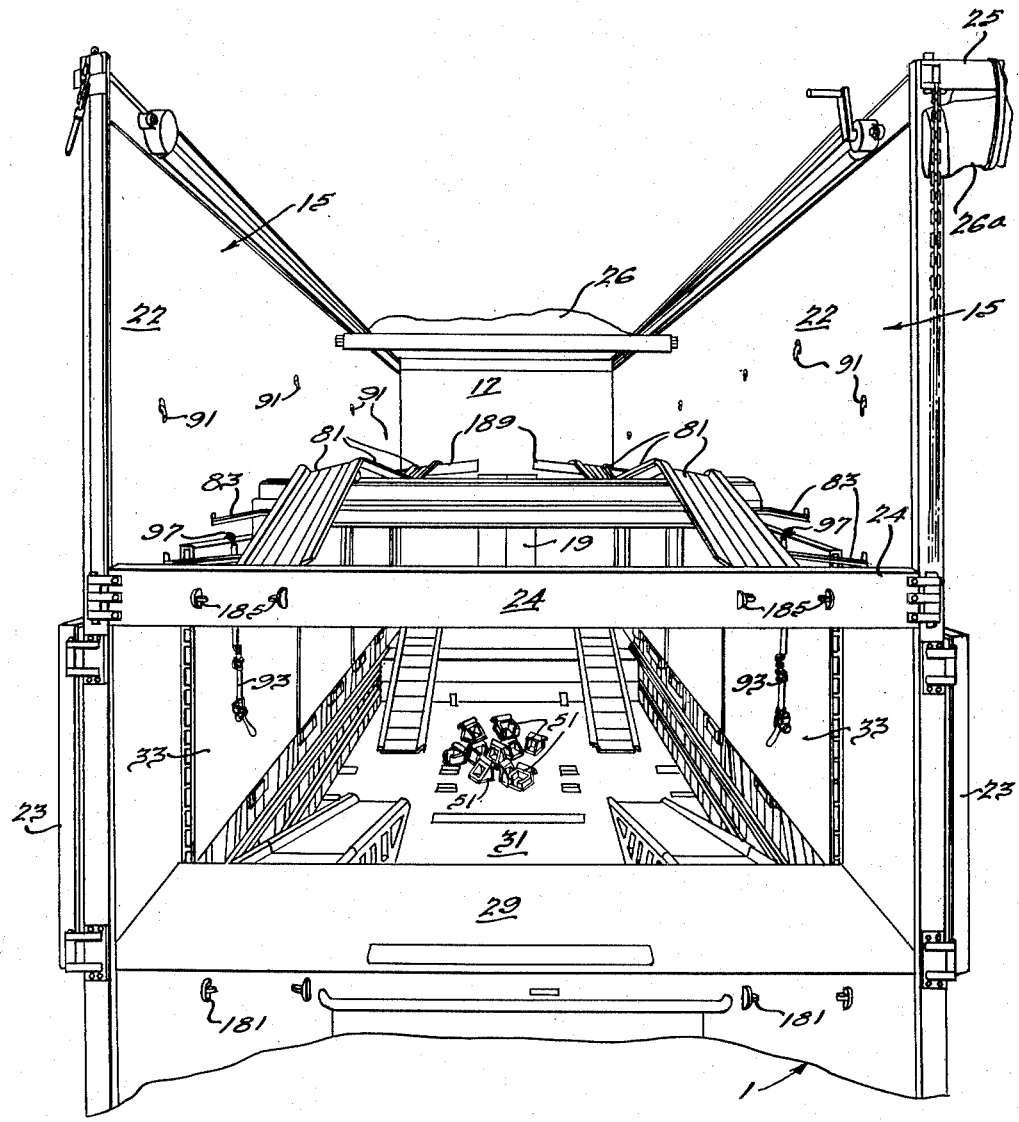
Figure 1 is a perspective view of the improved haul-away trailer taken from the rear thereof with the rear doors open but the central tie bar in place, and with the trailer in condition to carry automobiles.

The improved convertible automobile haulaway and freight van has a trailer body 1 which is adapted to be supported at front and rear portions 3 and 5 upon wheel and axle sets 7, the front portion 3 being illustrated specifically for attachment to the wheels and axle of a highway tractor through the medium of a pin 9 and fifth wheel 11 (Figures 4 and 5). The structural skeleton of body 1 is made up of suitable uprights and cross members 13, such as channels, which are connected together to form a rigid framework. The framework consists in the main of upright side and front portions to support continuous sidewalls 15 and a closed front end 17, the front end being provided with framework for an access door 19. The body framework is covered on the outside with a skin 21 (Figure 7) which is preferably of sheet metal but may be of other material, such as plywood. In order to reduce the size and weight of the framework, the skin 21 is secured thereto so as to be a load-carrying member, this being referred to in the art as a "stressed skin" design. Though not shown in Figure 4, Figures 1–3 and Figures 7, 14 and 17 illustrate the use also of an inner skin 22 that is suitably secured to the framework and may also be subject to stress, the skin 22 being shown in Figure 3 as comprised of upper and lower panels.

The body 1 has an open rear end through which both freight and automobiles are loaded. A feature of note, for reasons which will appear in the description of the body as a haulaway, is the use of rigid doors 23 for only about the lower half of the rear end opening, the doors, of course, being hinged to the sidewalls 15. Middle and upper tie bars 24 and 25 are hinged to the sidewalls at the rear end opening to furnish lateral support, and, obviously, other tie bars may be used throughout the body as required.

The top of the body 1 is provided with a removable and preferably flexible cover, such as the canvas roofing 26, which may be spread or rolled up by suitable hand crank and winch mechanism, as illustrated. A similar flexible cover 26a for the upper half of the rear end opening is also provided and may be carried by the tie bar 25.

As a freight van

The body 1 is provided with a fixed floor which includes the flat front and rear platforms 27 and 29 that are directly above the axle and wheel sets 7 and preferably approximately dock high, i. e. about fifty inches. The fixed floor also includes a middle section 31 that is between the wheel sets 7 and as far below the platforms 27 and 29 as practicable.

It will be recognized that the vertical space included between the planes of the platforms 27 and 29 and the floor section 31 comprises a storage well of appreciable capacity. However, when trailer is used as a freight van, it is ordinarily desired to have a substantially flat floor surface extending the entire length of the trailer. To meet this requirement, the surface 31 must be covered by floor-forming members which are either substantially in the plane of the platforms 27 and 29, in which case the latter form a part of the floor, or above the plane of the platforms 27 and 29, in which case the floor-forming members will extend the entire length of the trailer. The floor-forming members should be movable so that the floor section 31 can be uncovered and used to stow either freight or automobiles.

In the illustration of the present invention, the floor-forming members are placed in the plane of the platforms 27 and 29 to form therewith a dock high, flat freight storage surface extending the entire length of the trailer, as shown in Figure 3. The floor-forming members comprise a longitudinal series of panels 33 that are each approximately one-half the width of the body so that two abreast are required to cover a section of the lower floor 31. The panels are of rigid, lightweight construction, and are hinged at their outer and lower edges to suitable brackets on the sidewalls of the trailer body, as shown at 35 in Figure 7. While the floor panels 33 may be of various constructions, that illustrated has been very satisfactory. It comprises two extruded sections, preferably of aluminum alloy, which consist of plate sections 37 and integral angle sections 39 that are overlapped and riveted together in a joint 41. A channel 43 may be used to close the lower end of the panel and serve as a member to which the hinge 35 is secured. A thin plate 45 is riveted or otherwise secured to the angle sections 39 and channel 43 on the underside of the panel and serves also as a structural member.

The panels 33, when functioning as floor-forming members, are supported at longitudinally spaced intervals on a series of transversely extending crossbeams, preferably of standard cross section, such as an I-section (Figure 2), the size and material of which are chosen to make the beams as light in weight as possible consistent with the necessary strength. Extruded aluminum alloy beams have been found to be very satisfactory. As will be described hereinafter, these beams are used also to support upper car tracks. Each of the beams is removably supported by the sidewalls 15 of the trailer body 6. This attachment is preferably such that the crossbeams also serve at least partially as tie bars to brace the sidewalls against oilcanning, i. e. inward or outward deflection. Two different species of crossbeam arrangements are shown in Figures 10-13 to illustrate how this may be accomplished. The front and rear endmost crossbeams 49 serve only to reinforce the sidewalls 15 against inward deflection in addition, of course, to supporting the floor panels 33. The squared ends of the beams 49 rest in hanger brackets 51 which each consist of a plate bent into a right angle with a portion rebent to form a hook on the back of the upper leg. Side or web plates that are spaced apart the width of the beams 49 are suitably secured as by welding to the legs to prevent opening of the right-angle bend under load and also prevent fore or aft shifting of the beam in this socket. The brackets 51 hook onto rigid straps 53 that are fixedly secured to the sidewalls 15. The beams 49 are cut to a length substantially equal to the distance between the vertical faces of the brackets 51 so that by abutment therewith they take axial compression to prevent any inward movement of the sidewalls. It will be noted that a particular virtue in having the brackets 51 removable (see Figure 1) is that protuberances on the sidewalls and thus the danger of scratching automobiles are eliminated to make substantially the entire inside width of the trailer available for the stowing of automobiles, a factor which is of great practical importance since the width of automobiles is increasing though the permissible width of haulaways remains fixed by law.

Three intermediate floor-supporting crossbeams, a center beam 55 and outer beams 57, are provided between the end beams 49. The outer beams 57 are constructed and attached to the sidewalls in panel-supporting position in such a manner as to take axial tension as well as compression loads and thus serve also as tie bars. The squared ends of beams 57 fit in hanger brackets 59 that are hooked onto additional straps 53. While the brackets 59 are similar in concept to brackets 51, they have a horizontal beam-supporting plate and side webs which are wider than the beams 57. The vertical edges of the side webs are inturned to provide flanges 61, the inner edges of which are of lesser width than the length of cross pins 63 which are secured in the beams 57. The pins 63 fit in the brackets and by abutment with the flanges 61 transmit tensile forces to the beams 57 if the sidewalls should tend to bulge outwardly a substantial amount. Abutment of the ends of the beams 57 with the vertical back plates of the brackets 59 provides means whereby the beams may resist inward bulging of the sidewalls.

When used to support the floor panels 33, the center beam 55 is mounted on brackets such as 51 or 59 but, in the embodiment illustrated, is not intended to take axial tension. However, when used to support the upper car tracks, as will be presently described, the beam 55 is adapted to take tension loads and inhibit outward bulging of the sidewalls 15.

Figure 2:
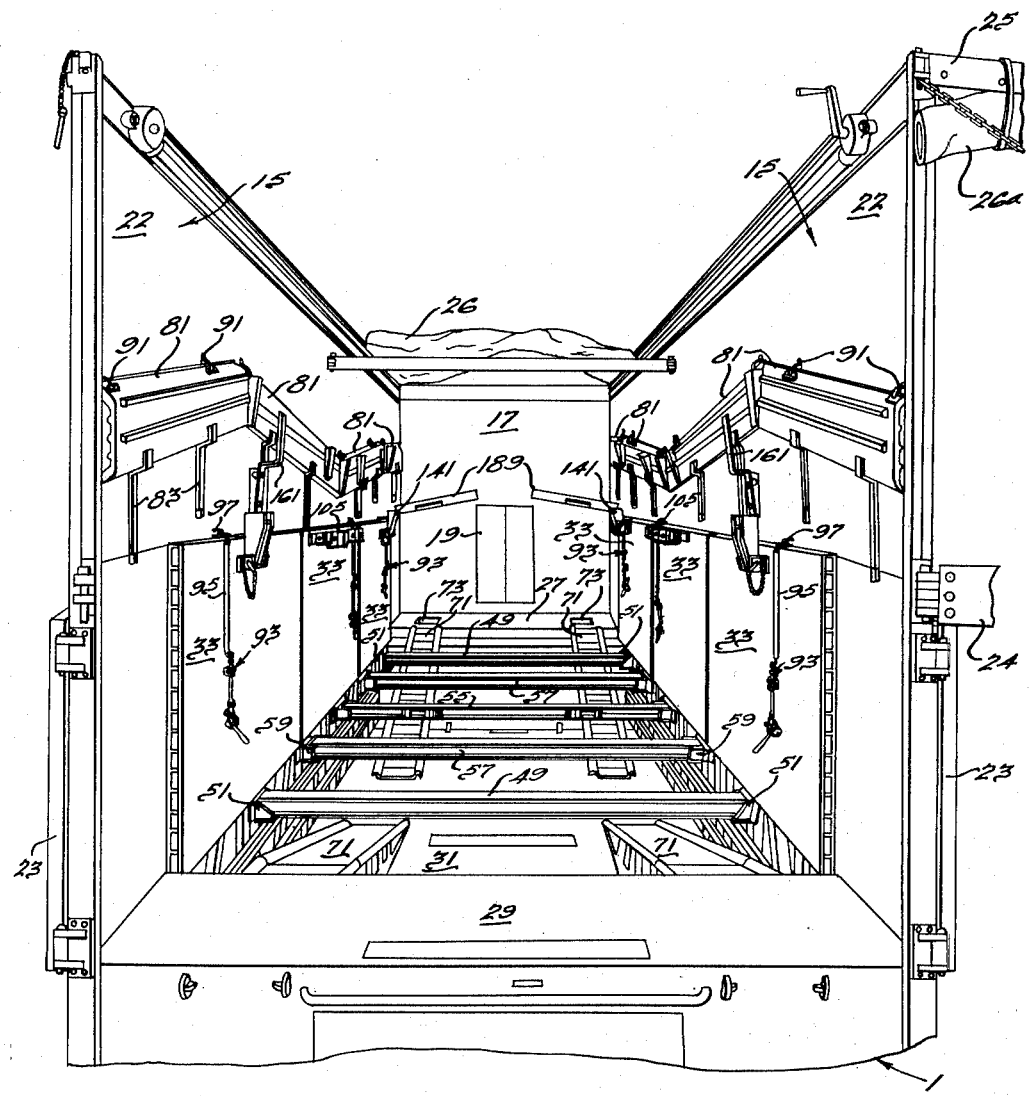
Figure 2 is a perspective view similar to that of Figure 1 but with the lower cross bars in place preparatory to lowering the floor panels to adapt the trailer to the carrying of general freight.

With the crossbeams 49, 55 and 57 in their respective brackets, as shown in Figure 2, the panels 33 may be easily and quickly lowered on their hinges 35 into the position of Figure 3. They then provide with the platforms 27 and 29 a flat storage surface which extends the entire length of the trailer body so that the latter becomes a freight van. As already mentioned, freight can be stored both on the panels 33 and beneath them, on the floor section 31.

As an automobile haulaway

The body 1 may be readily converted from the freight van of Figure 3 to the automobile haulaway of Figures 1, 4 and 5. As a haulaway, the body is adapted to carry two layers of automobiles and an important feature of the present invention is the use of the floor panels 33 and their crossbeams to furnish support for the upper layer of automobiles.

The lower layer of automobiles is supported on the fixed floor of the body 1 which, as mentioned above, comprises the front and rear platforms 27 and 29 and the middle floor section 31. For this purpose, automobile track sections 71 are provided to serve as inclined ramps between the surfaces of the platforms 27 and 29 and the surface of the floor section 31. If desired, wheel wells may be formed in the platforms to further facilitate the storage of automobiles, as shown at 73 in the front platform 27. While the track sections 71 may be fixed in position, they are preferably movable so as to enable shifting to permit optimum utilization of space above the middle floor section 31. In the illustrated embodiment, only two automobiles of the usual size are stowed in each layer and, in the lower layer, they will be inclined, as shown in Figure 5, with one set of wheels resting on the floor section 31 and the other on the front or rear platforms. Suitable tie down means (not shown) may, of course, be employed to prevent rolling of the automobiles.

The wheels of the upper layer of automobiles rest on four pairs of track sections 81, each pair being tilted or inclined to the vertical in a suitable manner to provide the desired inhibition to longitudinal movement or rolling. Each track section 81 is removably hinged to a sidewall 15 through the medium of lateral arms 83. The arms 83 are suitably secured at one end to the track sections, as by bolts 85 (Figure 7), and at the other are detachably mounted upon the sidewalls 15 by hinges 87 of a suitable type, for example a type containing a removable pin 89. When the body 1 is used as a freight van, the tracks 81 are folded up on their hinges 87 against the side walls 15, as shown in dotted lines in Figure 4. They are held in this position by suitable clamps 91.

The upper track sections 81, when used to hold automobiles, are supported by the crossbeams 49, 55 and 57, which in turn are preferably mounted on the floor panels 33. As already mentioned, the crossbeams 55 and 57 are adapted to take tension loads such as would be created by a tendency of the sidewalls 15 to buckle outwardly. Since these beams are mounted on the panels 33, the latter are connected to the sidewalls by means which transmits such loads thereto and which preferably also serves to hold the panels 33 in upright position when the crossbeams are not mounted thereon. A suitable means for this purpose is shown in Figure 14. This comprises a toggle clamp 93 that is rigidly mounted on the inner and bottom side of each floor panel 33 and which serves to take up slack in an encased chain or cable member 95 that may be removably attached at one end to the sidewall 15 at a point just above the top of the upright panel through the medium of hook eye 97, which is rigidly affixed to the sidewall. The other end of the chain 95 is attached to the stem 99 of the toggle clamp 93 so that upon movement of the handle 101 the chain may be slackened or tightened to allow or prevent disengagement from hook eye 97. Thus, outward movement of the sidewall will move the hook eye 97 outwardly to tighten chain 95 and this will result in a force acting to pivot the panel 33 outwardly on its hinge 35.

Figure 9:
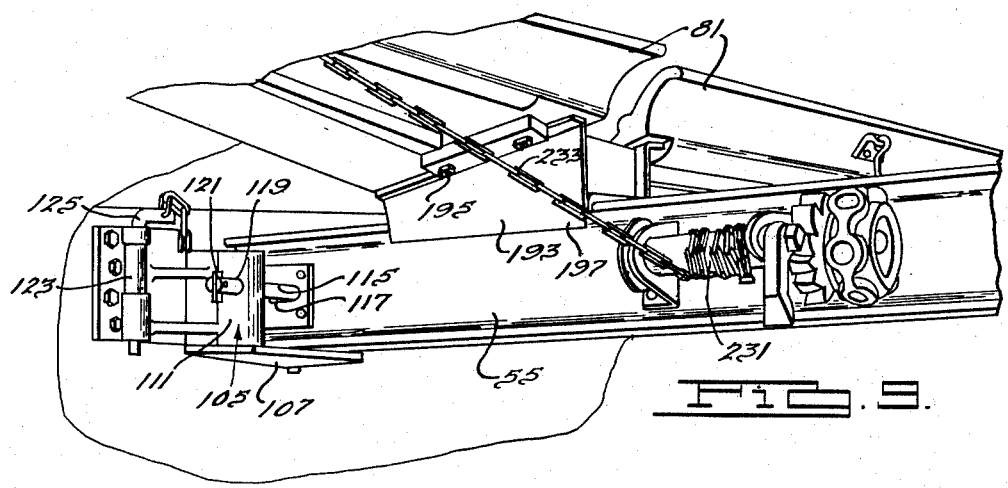
Figure 9 is a perspective view of the structure shown in Figure 8 and also of the tie down means on the crossbeam and is taken forwardly of the crossbeam looking rearwardly.
Figure 10:
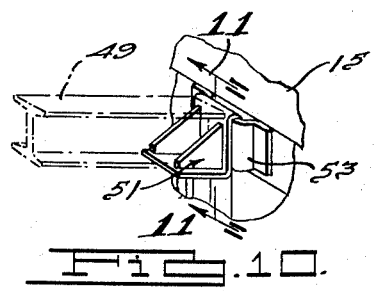
Figure 10 is an enlarged perspective view of the structure within the circle 10 of Figure 4 and shows one form of removable bracket for supporting the crossbeams.
Figure 11:
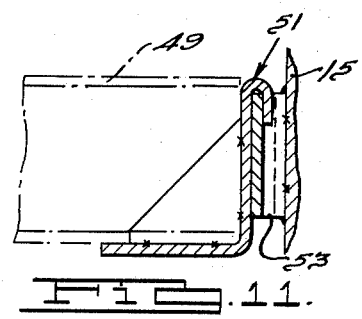
Figure 11 is a cross section taken on line 11—11 of Figure 10.
Figure 12:
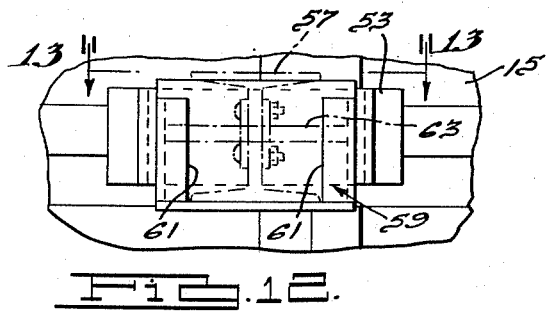
Figure 12 is an enlarged view of the structure within the circle 12 of Figure 4 and shows another form of removable bracket for supporting the crossbeams.
Figure 13:
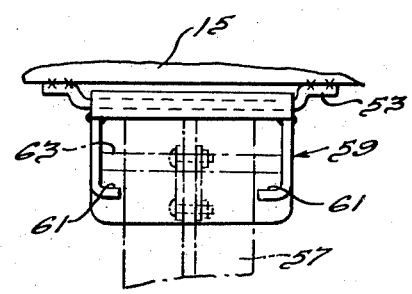
Figure 13 is a plan view of the structure of Figure 12 as taken on line 13—13 of Figure 12.

The middle crossbeam 55 is mounted at its ends on the center panel 33 through the medium of oppositely disposed brackets 105, one of which is illustrated in Figures 8 and 9. The bracket 105 has a horizontal plate 107, a vertical back plate 109, by means of which the bracket 105 is secured to the underside of the panel 33, and side webs 111. The beam 55 rests on the horizontal plates 107 and abutment of its ends with the back plates 109 prevents inward buckling of the sidewalls. Substantial outward movement of the sidewalls is prevented by means of the cross pins 115, which are removably mounted in slots 117 in the ends of the beam 55 and in holes 119 in the sidewalls 111. A rocker piece 121 on the end of each pin 115 serves to prevent accidental removal.

The beam 55 happens to lie in the same vertical plane when used to support both the center panel 33 and the upper track sections 81. Hence, means are provided to eliminate interference of the bracket 105 with the beam 55 when the panel 33 is lowered into position as a floor member. This is conveniently accomplished by hingedly connecting the ends of the back plate 109 to the panel 33. Such connections are shown at 123 and the pins 125 permit detachment of either or both ends of the bracket 105 so that it can be removed from the plane of the beam 55.

The intermediate beams 57 are supported in the upper position on brackets 131 which are shown affixed to the underside of the center panels 33 but which may obviously be removably secured thereto. (In fact, the brackets 59 could be used for this purpose by providing straps 53 on the panels.) The brackets 131 are substantially identical to brackets 59 and, therefore, have the inturned flanges which coact with the rigid cross pins 63 on the beams 57 to transmit tension loads from the sidewalls 15 to the beams. It will be observed (Figure 4) that the brackets 131 are on a slant to provide tilt for the tracks 81. The cross pins 63, therefore, by abutment with the webs of the brackets 131, prevent sidewise shifting of the beams 57 such as may result from the longitudinal component of force applied by the tracks to the beams.

The end beams 49 are supported upon brackets 141 that are mounted on the undersides of the end panels 33, as best illustrated in Figures 6 and 7. The brackets 141 are adapted to hold the beams 49 in a position somewhat above the top edges of the panels 33. They comprise side plates 143 that are rigidly secured to a back plate 145 and which support a rigid cross plate 147 near their upper ends. The lower ends of the side plates 143 contain suitable apertures by means of which the brackets are removably attached through the medium of cross pins 149 to angle plates 151 that are secured to the undersides of the panels. The back plate 145 has a projecting lip 153 that is adapted to rest on the top edge of the panel 33 and to be removably secured thereto through the medium of a screw or bolt 155 that threads into a suitable hole in the panel. The beams 49 rest on the cross plates 147 and fit the side plates 143 and, by abutment with the back plates 145, are able to prevent inward buckling of the sidewalls and to hold the end panels 33 in upright position.

As indicated in Figure 5, there is a possibility of interference between the end crossbeams 49 and automobiles stowed in the lower layer. This interference may be continuous or exist only temporarily during the actual process of stowing the automobiles. In the case of continuous interference, the expedient of Figure 7A may be employed if it is not desired to raise the height of cross plates 147 in brackets 141. This consists in merely arching the crossbeam 49' so as to obtain several additional inches of height for the lower layer of automobiles. These few inches happen to be critical and serve to eliminate the danger of the automobiles bouncing into the underside of the beam. A separate beam 49 may be used to support the floor panels 33 in the end brackets 51 or the latter may be lowered to accommodate the increased depth of the beam 49'.

Where the interference is only temporary, the beam could obviously be removed by simply lifting it from its place in brackets 131. However, a more desirable expedient from the standpoint of facilitating installation of the beam is illustrated in Figure 6. In this arrangement, the beam is connected to the sidewalls 15 for pivotal movement in an upward direction. To accomplish this, arms 161 are pivoted at 163 to the sidewalls. The other ends of the arms 161 are removably secured by thumb screws 165 to angle brackets 167 that are rigidly attached to the web of the beam, this connection permitting detachment when the beam 49 is used to support the panels 33 as a floor forming member. The beam may, therefore, be raised upwardly about the axis of pivots 163. In order to detachably hold the beam 49 in elevated position, lock bolts 169 are mounted on the arms and ride in slots 171 in guide plates 173 to which they may be clamped in various angular positions, as desired. A detent 174 may also be provided to hold the arm 161 in elevated position. It will be noted that the arms 161 also afford a force-transmitting connection between the beams 49 and the sidewalls to establish to some extent this beam as a tie bar.

In the use of the body 1 as an automobile haul-away, automobiles are preferably positioned in the lower layer after the beams have been set in position to support the upper tracks 81, as just described, but before the tracks 81 are folded downwardly from their stowed position against the walls 15 of the body. Thus, advantage is taken of the support which the beams can furnish to the sidewalls and upright floor panels. During loading, the rear beam 49 will be elevated on arms 161 to the dotted line position of Figure 6. Automobiles are loaded through the rear end and this is facilitated by ramps (not shown) which hook onto suitable fasteners 181 on the rear of the body at the level of the platform 29.

After the lower layer of automobiles is properly stowed, the tie bar 24 and doors 23 are closed. They furnish additional support for the sidewalls 15. The tie bar 24 has fasteners 185 on the outside thereof by means of which ramps (not shown) may be hooked on to permit automobiles to be driven up to the second layer during loading and unloading. The tie bar 24 also has rigid plates 187 (Figure 4) on the inside thereof which serve to support the rear ends of the upper tracks 81. The forward ends of the tracks 81 may be supported on suitable rigid members 189 affixed to the front wall of the trailer body 1.

During loading of the first layer of automobiles, the rear crossbeam 49 will ordinarily be elevated to the dotted line position of Figure 6. After lower loading is completed, this beam is lowered onto the brackets 141. The clamps 91 are released and the upper track sections 81 lowered in place on the crossbeams and the members 187 and 189. The cross sections of tracks 81, it will be noted, are slanted to the horizontal and the members 187 and 189 are tilted to accommodate this inclination. The crossbeams 49, 55 and 57 have horizontal surfaces, however, hence wedge-shaped filler blocks 193 are secured to the undersides of the track sections 81 to engage the beams whereby the desired track tilt may be maintained. The tracks 81 and the crossbeams 49 and 55 are arranged so that the intersection of adjacent track sections occurs in the plane of these beams. Thus, as shown in Figure 9, a common block 193 may be used to support the adjacent track sections. The block 193 is secured by bolts 195 to the underside of one of the tracks 81 and has a flange upon which the other track rests. The lower part of the block 193 has vertical edge flanges 197 which fit over the flanges of the beams. The same type of block 193 may be used on the underside of the intermediate track sections to engage the intermediate crossbeams 57. It will be recognized that, by virtue of the tilt provided by wedges 193, the tracks 81 automatically center automobiles thereon between the sidewalls 15. Furthermore, they add an extra four or five inches to the height of the central part of the space occupied by lower level automobiles and this is often critical enough to allow the automobile to be loaded without raising the level of the upper tracks 81. Automobiles on the upper track engage near the center so that they are actually elevated only a fraction of this increase in height.

With the floor sections 81 in supported position, automobiles may be driven into the body 1 to form the second layer. The central crossbeam 55, which lies between automobiles supported on the upper tracks 81, is provided with tie down means 231 whereby longitudinal shifting of the automobiles in transit may be prevented. The tie down means may be a winch or windlass whereby chains, ropes, cables or similar flexible members 233 may be attached to the automobiles and then tightened with a desired force so that, in combination with suitable or similar tie down means 231 at the opposite end of the automobile, the automobile will be firmly anchored in position; this usually involving actual depression of the automobile springs and flattening of the tires so as to prevent bouncing and lowering the overall height.

Opposite sides of the center beam 55 are preferably provided with the tie down devices 231 so that the adjacent ends of both automobiles on the upper layer may be secured thereto and also for force equalization purposes, as will be presently mentioned. The devices are preferably arranged so that the chains 233 are longitudinal of the body, i. e. the device 231 and the point of attachment of a chain with the automobile define a plane that is substantially parallel to the longitudinal midplane of the tracks 81. Preferably, two tie down devices are used for the end of each automobile and these are laterally spaced and between the tracks 81, as shown in Figure 17.

A suitable winch-type tie down means 231 comprises a pair of spaced trunnion brackets 235 and 237 that are mounted on the vertical web of the crossbeam 55. A shaft 239 is rotatably mounted in the trunnions, suitable means being provided to prevent endwise movement thereof. The shaft 239 has a radial pin 241 or the like by means of which the chain 233 may be secured thereto. The shaft is rotated by insertion of a lever bar (not shown) into one of several radial apertures 243 in a flange 245 that is secured to the shaft. It will be recognized that after one end of the chain 233 has been secured to an automobile and the other to the shaft 239, rotation thereof will take up the slack in the chain and, by applying suitable leverage to the flange 245, the desired tension can be obtained. Reverse rotation and loss of tension are prevented by suitable means, such as the toothed ratchet wheel 247 fixed on the shaft 239 and the ratchet pawl 249 that is hinged to the bracket 237 so as to be capable of operative engagement with the teeth of the wheel.

The tension of the chain 233 is, of course, transmitted to the crossbeam 55 through the devices 231. Due to the arrangement of the devices on opposite sides of the same beam, the horizontal tie down forces applied to two fore and aft vehicles oppose and tend to cancel each other so that the resultant force on the beam is relatively small and, in the ideal case of equal tension on all chains, is zero. The vertical forces are additive, however, and in opposition to the gravity force from the track sections and in effect lighten the center crossbeam 55 so that impacts of sufficient force may cause the resultant force on this beam to be upward. If this should occur, the cross pins 115 will take the force and hold the beam 55 in position so that it does not rise from its normal position of rest in bracket 105.

Due to the fact that the automobiles in the lower level are inclined somewhat, the actual over-all length which they occupy in the trailer is somewhat less than that occupied by automobiles in the upper level with the track arrangement illustrated. However, the fact that the upper half of the rear end is open permits a car in the upper level to project beyond the end of the body 1, a feature which may be of critical importance in hauling long automobiles, such as the Cadillac convertible.

As has already been indicated, the crossbeam construction of this invention is an important factor in developing structural stability of the body because of its function as tie bars for the side walls. A further advantage of this nature is the fact that the loads from the crossbeams in upper position are not concentrated on the sidewalls at single points. Instead, due to the fact that beams are carried by the panels 33, the beam loads are transmitted to the sidewalls through each of the hinge points 35 of the panels and are thus spread throughout the entire length of the body 1. Furthermore, the loads are transmitted to the walls at a lower and more stable level so that the column effect is minimized.

While the preferred form has already been described in which the crossbeams transmit loads to the sidewalls through the panels, the construction may also be such that the beams transmit part of the loads directly to the sidewalls and the balance to the sidewalls through the panels. Such a construction is shown in Figure 15. Here the sidewall 15 is provided with a horizontal support bar which comprises an upwardly opening horizontal channel 211 that, if needed, has a horizontal web plate 213 therein. The crossbeam 49 has a pad or block 215 welded or bolted to the underside thereof which rests on the web plate 213 to transmit load from the beam thereto and